United States Patent
Pena et al.

(10) Patent No.: US 11,068,033 B2
(45) Date of Patent: Jul. 20, 2021

(54) EXPANSION CARD RETENTION

(71) Applicant: HEWLETT-PACKARD DEVELOPMENT COMPANY, L.P., Spring, TX (US)

(72) Inventors: Omar Pena, Fort Collins, CO (US); Tom J Searby, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/482,378

(22) PCT Filed: Jul. 19, 2017

(86) PCT No.: PCT/US2017/042848
§ 371 (c)(1),
(2) Date: Jul. 31, 2019

(87) PCT Pub. No.: WO2019/017934
PCT Pub. Date: Jan. 24, 2019

(65) Prior Publication Data
US 2020/0133354 A1    Apr. 30, 2020

(51) Int. Cl.
*G06F 1/18*    (2006.01)
(52) U.S. Cl.
CPC .................................. *G06F 1/186* (2013.01)
(58) Field of Classification Search
CPC .................................. G06F 1/186; G06F 1/185
See application file for complete search history.

(56) References Cited

U.S. PATENT DOCUMENTS

| | | | |
|---|---|---|---|
| 6,693,802 B2 * | 2/2004 | Vier | H05K 7/1429 361/752 |
| 6,771,510 B1 | 8/2004 | Novak et al. | |
| 7,012,813 B2 | 3/2006 | Wang et al. | |
| 7,265,997 B2 | 9/2007 | Jing | |
| 7,310,241 B2 | 12/2007 | Peng et al. | |
| 7,561,440 B2 | 7/2009 | Dai | |
| 8,636,528 B2 * | 1/2014 | Sass | H01R 12/7029 439/157 |

(Continued)

FOREIGN PATENT DOCUMENTS

CN      201063129      5/2008

OTHER PUBLICATIONS

Dell OptiPlex Xe2 Small Form Factor Owner's Manual.

*Primary Examiner* — Rockshana D Chowdhury
(74) *Attorney, Agent, or Firm* — Dicke Billig & Czaja PLLC (57) ABSTRACT

Some examples include an expansion card retention device, comprising a retaining arm and a retaining bracket. The retaining arm is rotatably attachable to a chassis and moveable between an open state and a closed state. The retaining arm is postionable along the expansion card and includes an interior face to provide multi-point support along a top edge of the expansion card. The retaining bracket is rotatably coupled to the retaining arm. The retaining bracket pivotable about a first axis at a first end of the retaining arm. The retaining bracket includes a contact surface to engage with an interconnect bracket in the closed state. The retaining arm and retaining bracket are movable together between the open state and the closed state with a single user controlled operation.

14 Claims, 7 Drawing Sheets

(56) References Cited

U.S. PATENT DOCUMENTS

| | | |
|---|---|---|
| 9,223,359 B2 | 12/2015 | Lin |
| 10,058,006 B2 * | 8/2018 | Hung .................. H05K 7/1487 |
| 10,558,248 B2 * | 2/2020 | Adrian .................. G11B 33/10 |
| 10,686,268 B2 * | 6/2020 | Wang .................. H05K 7/1411 |
| 2004/0037048 A1 | 2/2004 | Liao |
| 2011/0026235 A1 * | 2/2011 | Searby .................. G06F 1/185 |
| | | 361/810 |
| 2015/0048727 A1 | 2/2015 | Liu et al. |
| 2019/0075668 A1 * | 3/2019 | Adrian ................ H05K 5/0221 |

* cited by examiner

EXPANSION CARD RETENTION

BACKGROUND

Many electronic systems such as computing devices include one or several expansion cards. The expansion cards are typically inserted into connector slots within a computer casing.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Peripheral component interconnect, or PCI, is a local bus connection for a computing device. The PCI specification has adopted several standardized formats, physical parameters and protocols for connecting hardware devices to a computing device. The hardware devices, or peripheral devices, include expansions cards, such as networks cards, sounds cards, modem, USB ports, and disk controllers. A conventional expansion card has a bent section at its distal end for being fixed to a computer casing. The term expansion card, as used herein, is intended to include all types of expansion cards, including peripheral component interconnect (PCI) and peripheral component interconnect express (PCIe) cards.

In accordance with aspects of the present disclosure, a retention device is useful for securing a single or a plurality of expansion cards to a printed circuit assembly (PCA), also referred to as a system board or motherboard, of an electronic device, such as a computer. The motherboard can be located in a chassis of the electronic device. The motherboard is positioned on an interior wall of a chassis. A plurality of expansion card slots are mounted to the motherboard for connecting the expansion cards. Expansion cards can be prone to be loosened or detached from the slots of the motherboard. Once inserted, the expansion cards are desirably fixed in place in order that their interconnections within the computer casing remain intact. The retention device can be secured across a top edge of the expansion cards and the chassis structure to securely retain the expansion cards in place connected to the motherboard. A multi-point support can be employed including front, mid, and rear retention, for example, to securely retain the expansion cards.

Figure 1A:
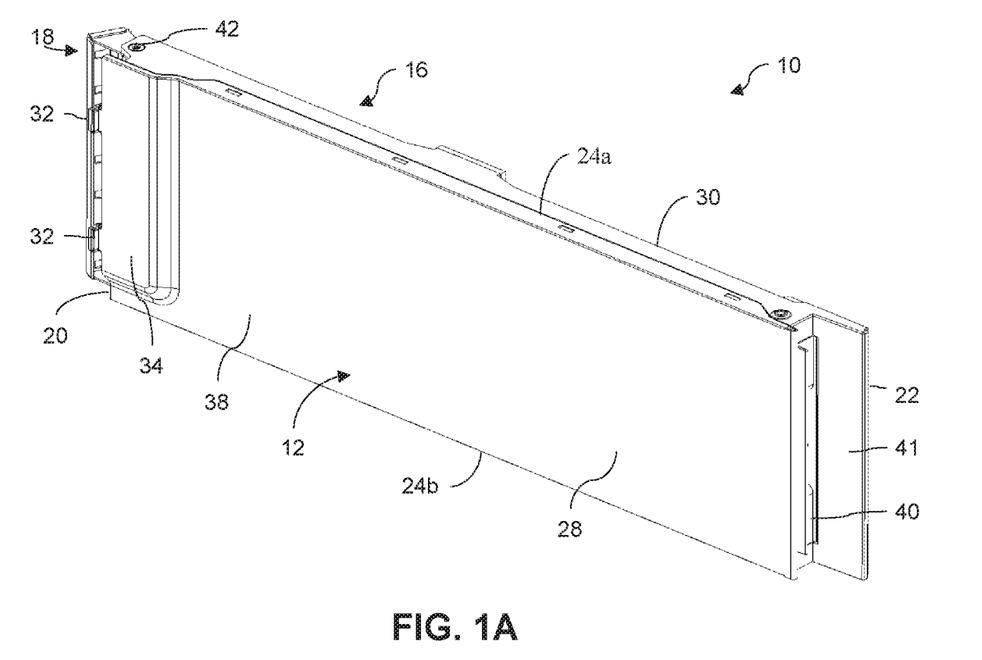
FIGS. 1A and 1B are perspective views of a retention device in accordance with aspects of the present disclosure.
Figure 1B:
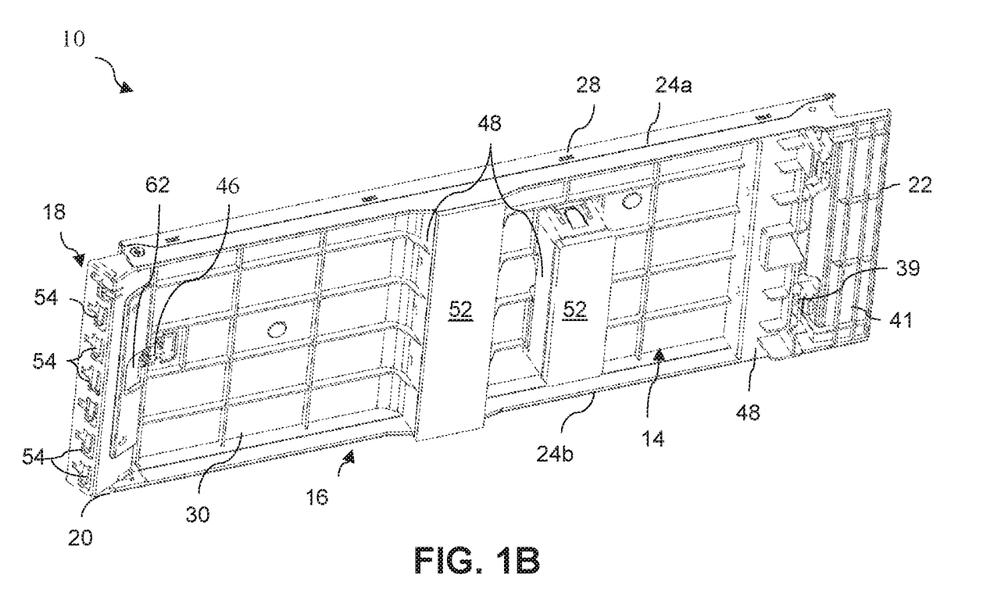

FIGS. 1A and 1B are perspective views of a retention device 10 in accordance with aspects of the present disclosure. FIG. 1A illustrates a perspective view of an exterior face 12 of retention device 10. FIG. 1B illustrates a perspective view an interior face 14 of retention device 10. Retention device 10 includes a retaining arm 16 and a retaining bracket 18. Retaining bracket 18 is rotatably coupled to retaining arm. Retention device 10 can be coupled to a computing device 100 across a chassis opening for maintaining expansion cards 102 within a chassis 104 (see, e.g., FIGS. 4A-4B and 5A-5D), as described in further detail below.

Figure 2A:
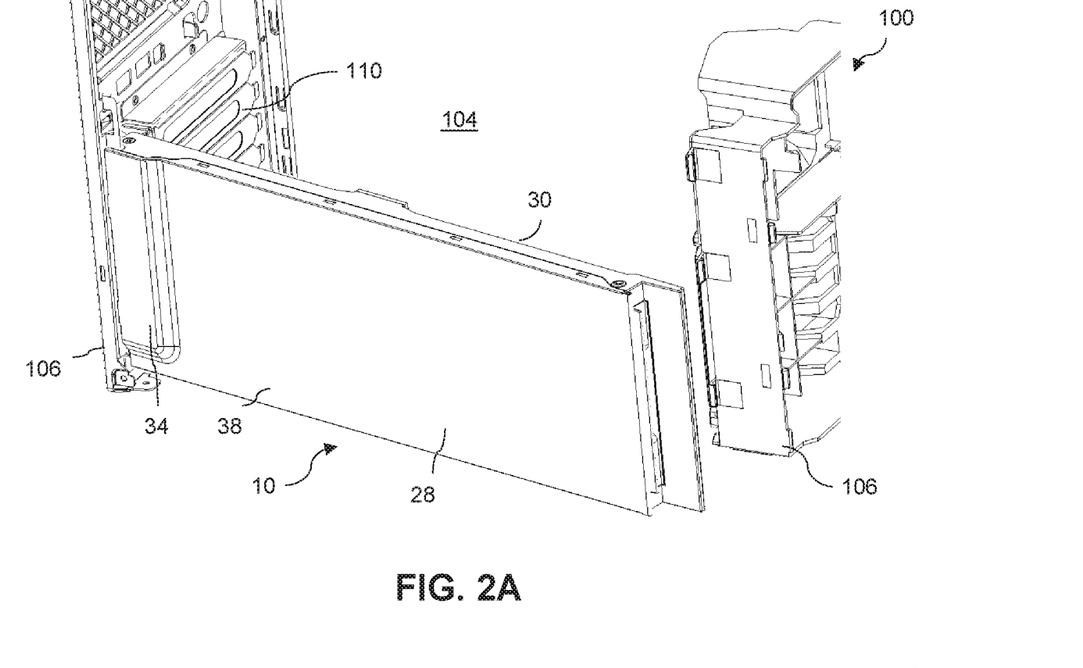
FIGS. 2A and 2B are perspective views of the retention device of FIGS. 1A and 1B coupled to a computing device in accordance with aspects of the present disclosure.
Figure 2B:
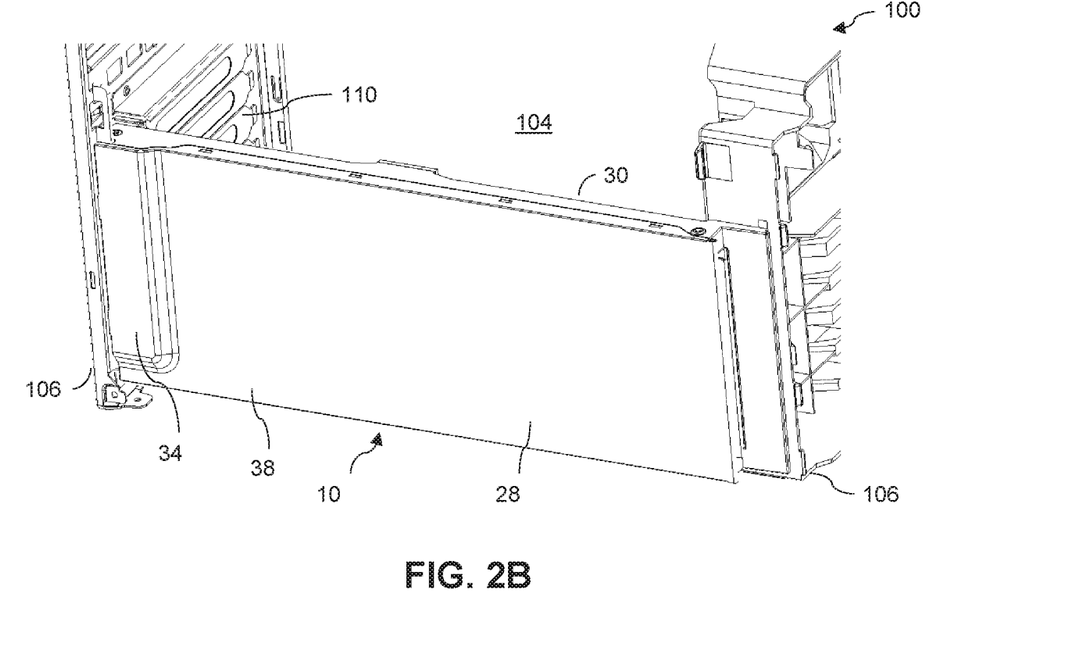

With additional reference to FIGS. 2A and 2B, retaining arm 16 can be generally rectangular, including a first end 20, a second end 22, and two opposing sides 24a, 24b. Retaining arm 16 can be any suitable size and shape appropriate to extend over and cover chassis opening and provide access in order to remove and install expansion cards 102 within chassis 104. Retaining arm 16 can include a cover 28 forming exterior face 12 and a support plate 30 forming interior face 14. Support plate 30 can extend distal to cover 28 at second end 22. Cover 28 can include a major cover portion 38 and a raised shoulder portion 34. In one example, major cover surface 38 is generally planar.

First end 20 includes a coupler 32 that is mateable with a receiver of casing at chassis opening (see, e.g., FIGS. 5A-5D). Shoulder 34 can provide structural support and strength to a coupler 32 at first end 20. A mateable portion of coupler 32 extends outside, or distal, of shoulder 34. Coupler 32 can be a hook, for example, although other forms of couplers are also acceptable. More than one coupler 32 can be included. In one example, two couplers 32 are included.

Retaining arm 16 can be any suitable size and shape appropriate to extend over and cover chassis opening and provide access in order to remove and install expansion cards 102 within chassis 104. Second end 22 can include a release latch 40. Release latch 40 can include a release latch lever for user contact on the exterior and latch hooks 39 on the interior 40 to selectively couple and uncouple second end 22 to casing 106 of computing device 100 when operated by a user. In some examples, release latch 40 can include an extension plate 41 formed of an exterior exposed portion of support plate 30. Extension plate 41 can form a lower surface for user interface with release latch 40 and extended cover over a perimeter edge of chassis 104. Second end 22 is disposed against chassis 104 in a closed position. Releasable latch 40 serves as a contact or touch point, or a user contact area that a user can contact to selectively engage, or attach, second end 22 to chassis or selectively disengage second end 22 from chassis. Releasable latch 40 can be a press release, for example.

With reference to FIG. 1B, interior face 14 of retaining arm 16 includes support 48 for contacting expansion card(s). Supports 48 can include a front support and a middle support. Additional support(s) 48 can be included as appropriate. Supports 48 can extend fully or partially between opposing sides 24a, 24b of retaining arm 16. In some examples, supports 48 are removable. Supports 48 can project outwardly from adjacent portions of interior face 30 having a contact surface 52 that is positionable parallel to, and against, a top edge 107 of expansion card 102. In other words, interior face 30 is recessed from contact surface 52 of supports 48. In one example, contact surface 52 is planar and provides even pressure and support across any and all installed expansion cards 102. Recessed areas of interior face 14 between supports 48 provides space for cables (not shown) to be extended through.

Figure 3A:
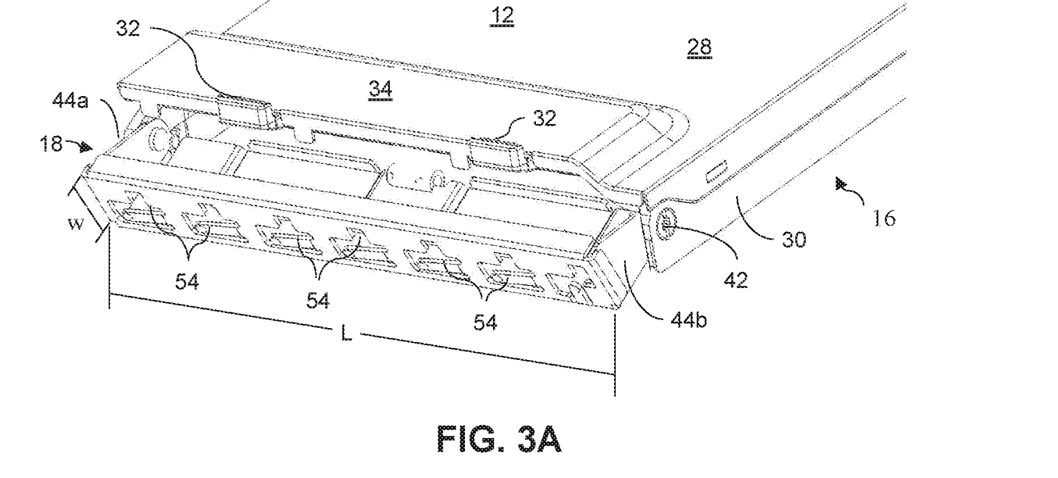
FIGS. 3A-3C are enlarged perspective views of a first end of a retaining arm and a retaining bracket of a retention device in accordance with aspects of the present disclosure.
Figure 3B:
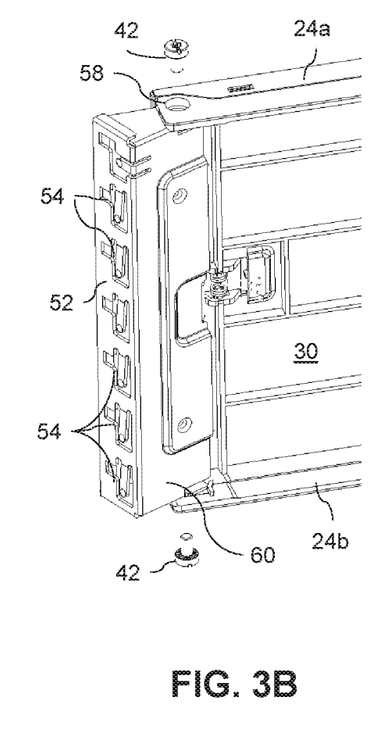
Figure 3C:
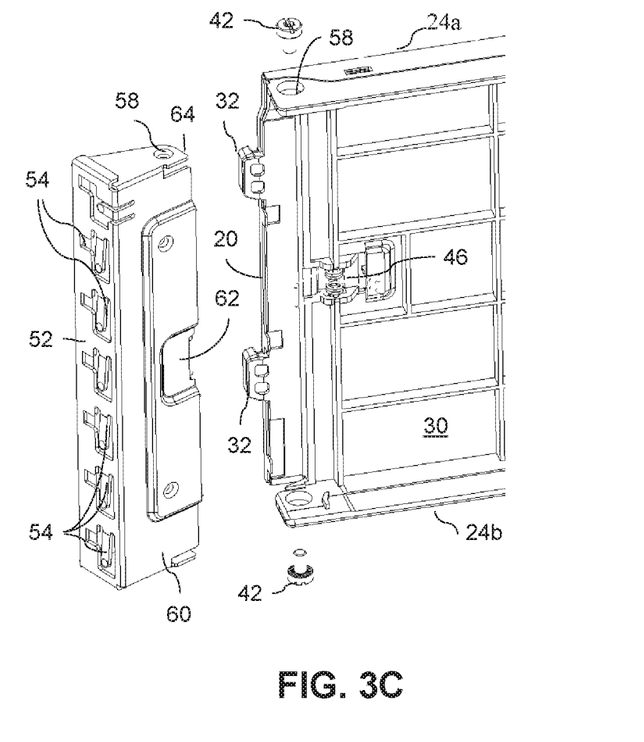

With additional reference to FIGS. 3A-3C, retaining bracket 18 is coupled to retaining arm 16 at first end 20 of retaining arm 16. Retaining bracket 18 can be coupled to retaining arm 16 with fasteners 42 disposed at opposing ends 44a, 44b of retaining bracket 18. A biasing mechanism 46 can be disposed to contact both retaining arm 16 and retaining bracket 18 to biasedly position retaining bracket 18 at an angle with respect to retaining arm. During and upon installation of retaining device 10 in chassis 104, pressure applied to retaining bracket 18 greater than the biasing force repositions retaining bracket 18 to be disposed perpendicular to retaining arm 16 when fully installed.

Retaining bracket 18 is pivotably connected to retaining arm 16 with fasteners 42. Fasteners 42 can be removable inserted into holes 58 in each side. Biasing mechanism 46 can be included at interior face 14 of retaining arm 16 to bias against a lower face 60 of retaining bracket 18 to extend away from interior face 14. Fasteners 42 and biasing mechanism 46 are detachable from retaining bracket 18 to uncouple and disassemble retaining bracket 18 from retaining arm 16, as illustrated in FIG. 3C. Lower surface 60 can includes a recess or opening 62 to removably maintain a biased end of biasing mechanism 46. Disassembly of retaining arm 16 from retaining bracket 18 includes removing fasteners 42 from holes 58 and disengaging biasing mechanism 46 from recess 62. In one example, ends 44a, 44b of retaining bracket 18 taper from contact surface 52 to opposing pivot end 64, forming a generally trapezoidal shape. Retaining bracket 18 can be open or closed top face and is shown with an open top face.

Retaining bracket 18 includes slotted openings 54 on a contact surface 52. Contact surface 52 has a width "w" substantially equivalent to a width of rear panel 110, or interconnect bracket and without extending over a top edge 105 of expansion card 102. Contact surface 52 can extend along a top of interconnect bracket 110 and interfaces 112 mated with a tab 107 of expansion card 102 to be disposed adjacent to top edge 105 of expansion card 102 without extending over top edge 105. A series of slotted openings 54 can extend in a row across a length "L" of contact surface 52 extending between ends 44a, 44b. Contact surface 52 can have a length "L" to extend partially or completely across interconnect bracket 110. Slotted openings 54 can be slotting in one or multiple directions to provide for mating with a rear panel 110, or interconnect bracket, within chassis 104. In one example, each slotting opening 54 can be "T" shaped, with opening extending in both x-axial and y-axial directions. With additional reference to FIGS. 4A-4B and 5A-5D, slotted openings 54 are mateable with interfaces 112 disposed along a top surface of rear panel 110.

Figure 4A:
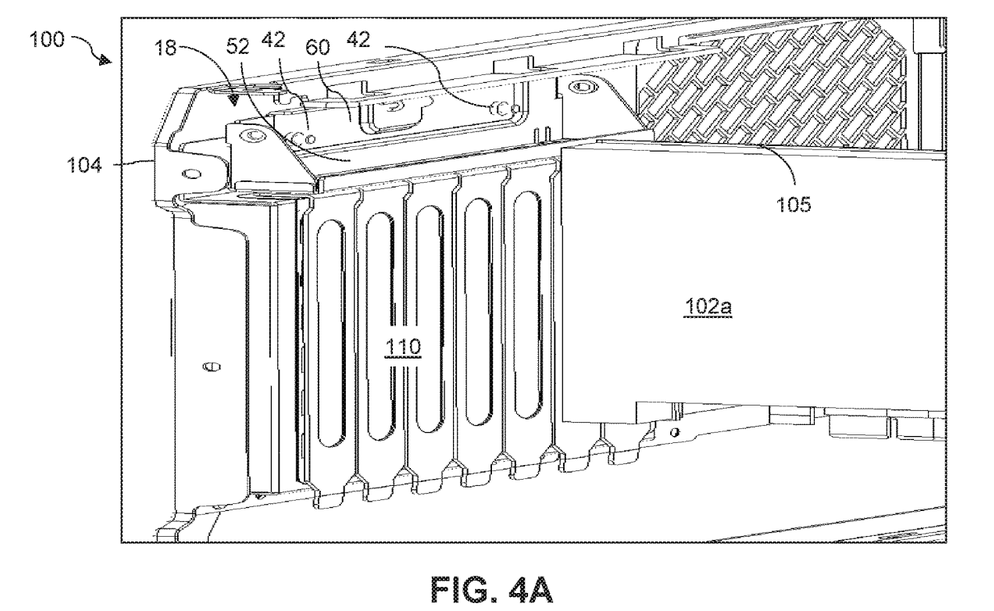
FIGS. 4A-4B are views of an example retaining bracket coupled to a computing device in accordance with aspects of the present disclosure.
Figure 4B:
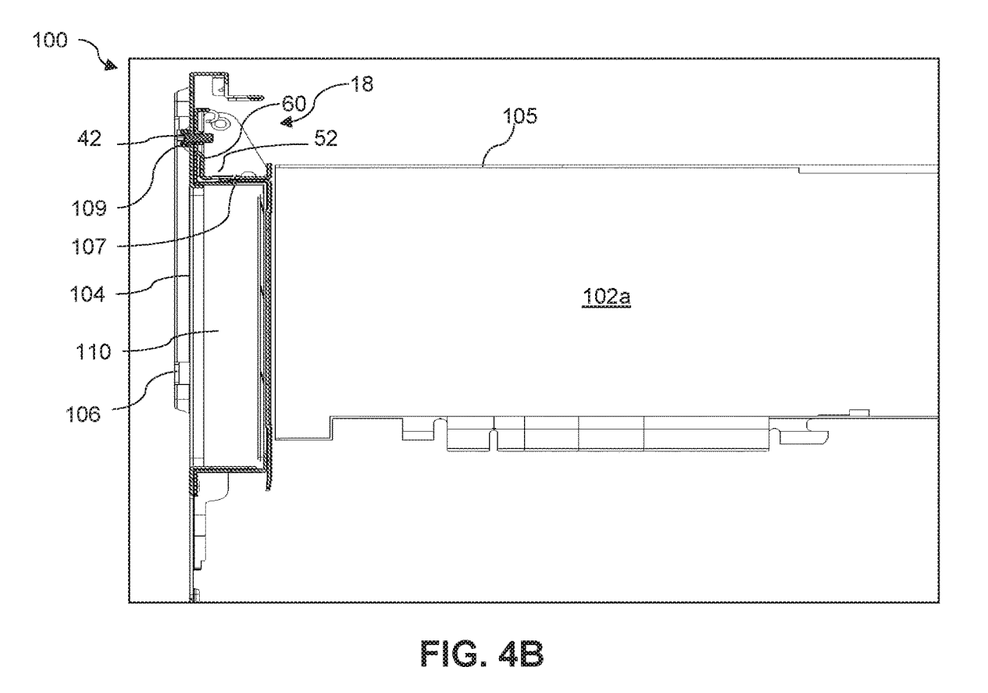

FIGS. 4A-4B are views of an example retaining bracket 18 coupled to a computing device 100 in accordance with aspects of the present disclosure. It can be desirable to install retaining bracket 18 without retaining arm 16. For example, to accommodate expansion cards 102a of specific size and design, it may be useful to assemble retaining bracket 18 to chassis without retaining arm 16. For example, assembling retaining bracket 18 separate from retaining arm 16 may be useful for securing non-standard PCIe cards within chassis 104. Retaining bracket 18 can be positioned along interconnect bracket 110 and pivoted adjacent a top corner of expansion card 102a to engage contact surface 52 with top of interconnect bracket 110 and lower surface 60 with a side of chassis 104. Lower surface 60 extends at an angle to contact surface 52. In one example, lower surface 60 and contact surface 52 are perpendicular to one another. Lower surface 60 can include holes 59 extending through suitable to accommodate fasteners 42 or other suitable fastener. Retaining bracket 18 can be coupled to computing device 100 with fasteners 42 inserted through holes 59 aligned with holes 109 of chassis 104 or casing 106 to provide support and retain PCIe cards along rear panel 110.

Figure 5A:
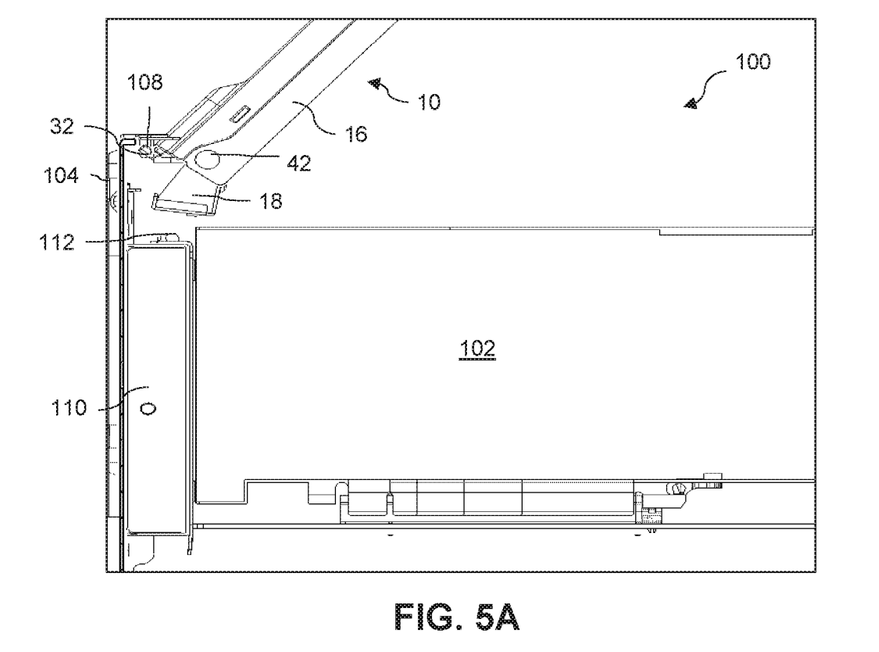
FIGS. 5A-5D are side views of an example retention device coupled to a computing device in accordance with aspects of the present disclosure.
Figure 5B:
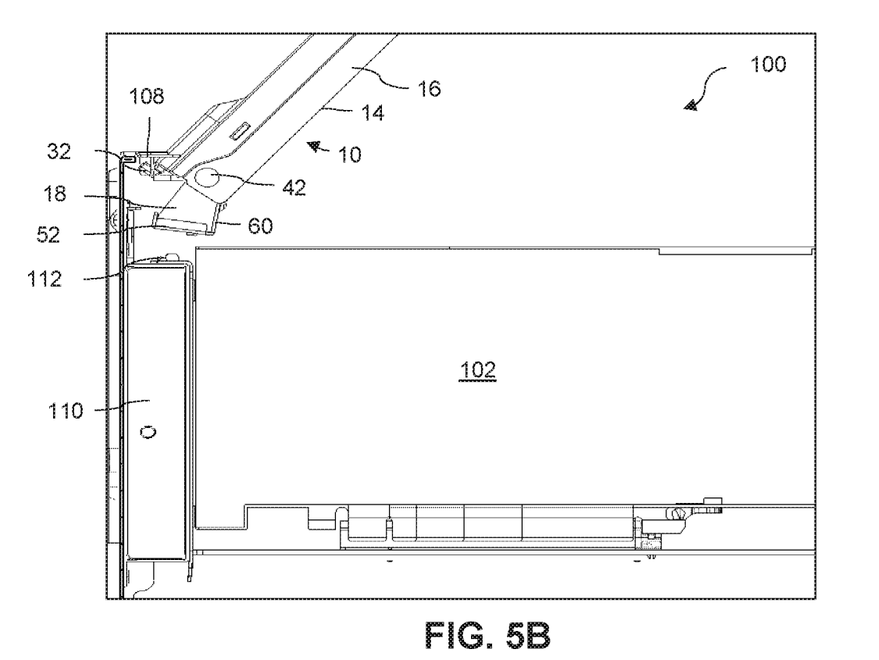
Figure 5C:
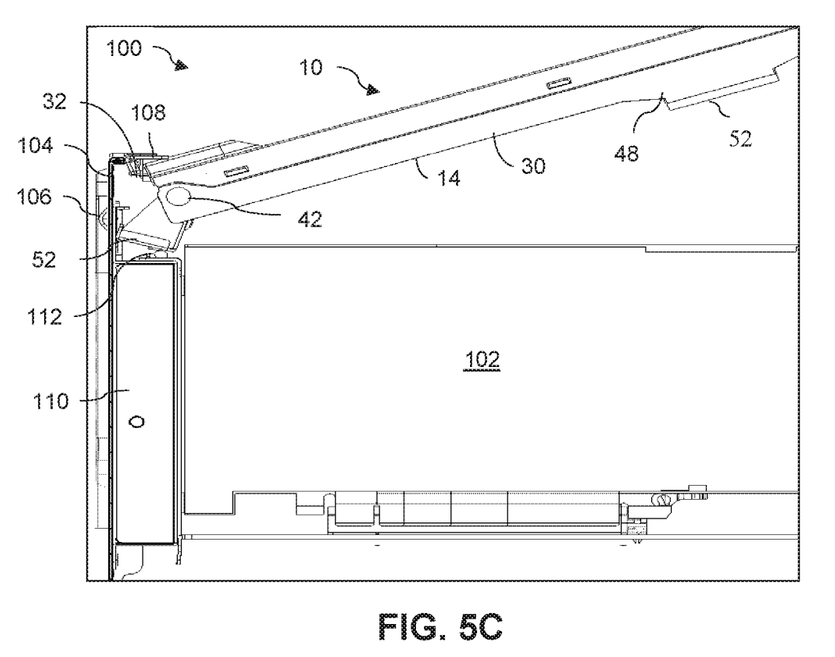
Figure 5D:
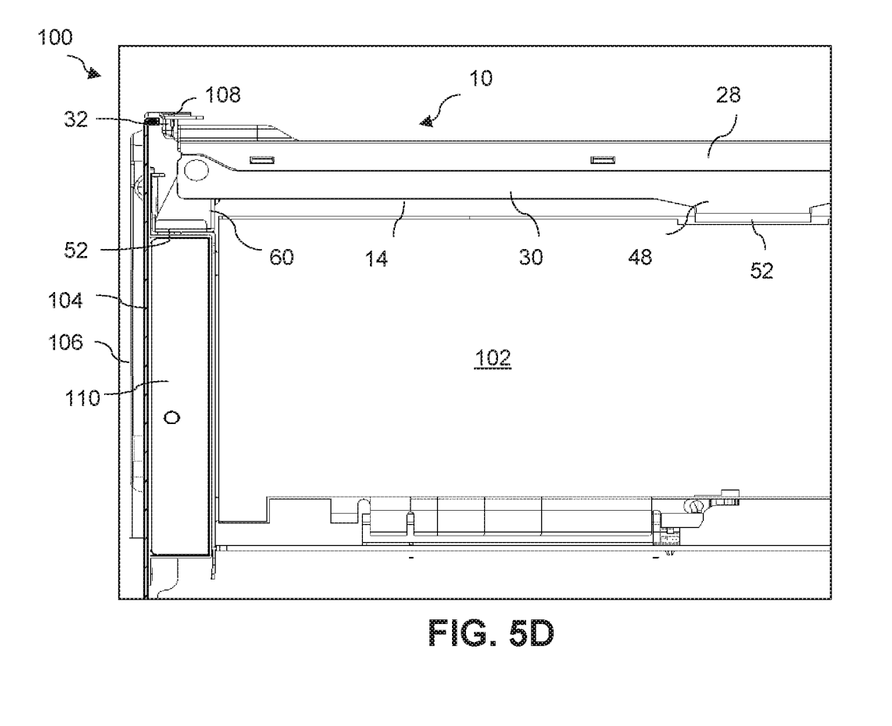

FIGS. 5A-5D illustrate side views of an example retention device 10 coupled to computing device 100 in accordance with aspects of the present disclosure. Retention device 10 is attachable to chassis and moveable between an open state and a closed state as described in more detail below. Retaining arm 16 and retaining bracket 18 of retention device 10 are moveable together between the open state illustrated in FIG. 5A and the closed state illustrated in FIG. 5D. As illustrated in FIG. 5A, coupler 32 of retaining arm 16 is mated with, and attached to, receiver 108 of chassis 104. In one example, receiver 108 of chassis 104 has an opening that coupler 32 can be slidably inserted into. With first end 20 of retaining arm 16 attached to chassis 104 adjacent the chassis opening, retaining arm 16 can be pivoted about an axis formed by the mated coupler 32 and receiver 108. FIG. 5B illustrates retaining arm 16 beginning to be rotated downward toward expansion cards 102 and chassis 104. As illustrated in FIG. 5C, retaining arm 16 is pivoted with second end 22 being moved closer to chassis 104. Biasing mechanism 46 maintains retaining bracket 18 at an obtuse angle from interior face 14 of support plate 30 to clear the top edge of expansion card 102 adjacent rear panel 110. As retaining arm 16 is moved downward, retaining bracket 18 contacts and slidably moves downward along an inner surface of chassis 104, pivoting retaining bracket 18 about a first axis formed by fasteners 42 and forcing biasing mechanism 46 into a biased state as contact surface 52 of retaining bracket 18 contacts rear panel 110 and slotted openings 54 align and mate with interfaces 112 of rear panel 110. Retaining bracket 18 is pressed downwardly to fully contact a top surface of rear panel 110. Second end 22 of retaining arm 16 continues to be pivotally moved downward until reaching a closed state with retaining arm 16 contacting chassis 104 causing support 48 to engage and press against a top edge of expansion cards 102, as illustrated in FIG. 5D.

Retention device 10 can be installed and removed from chassis 104 by a user and without tools, providing ease of installation and convenience to a user. Retention device 10 is removed as a single unit, with retaining arm 16 and retaining bracket 18 removable together through a single user operation. A user grabs the exterior portion of releasable latch 40 to move latch hooks 41 and release second end 22 from chassis 104, lifting and pivoting second end 22 upward and away from chassis 104, then continuing to lift first end 20 and retaining bracket 18 away from rear panel 110. Expansion cards 102 can then be removed from or installed in chassis 104 as desired.

Figure 6:
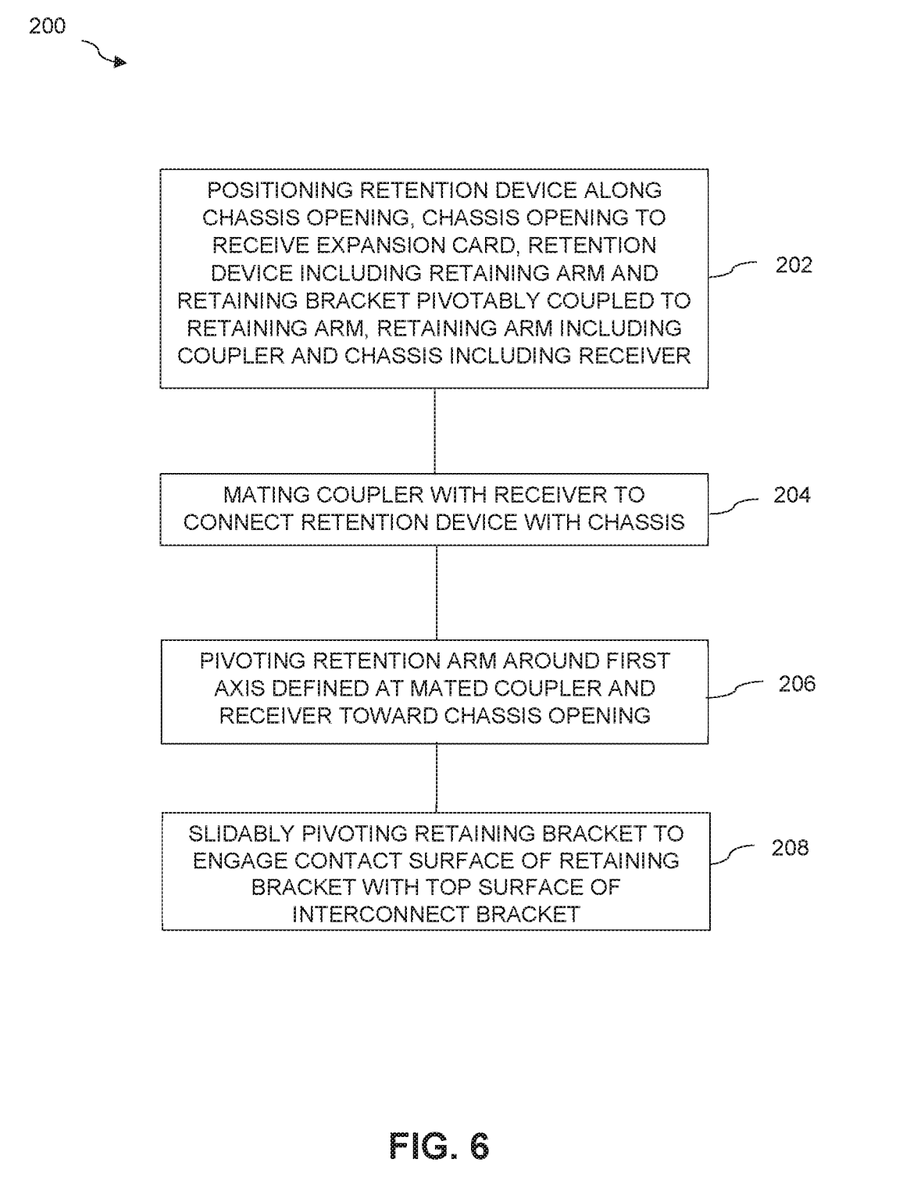
FIG. 6 is a flow chart of an example method in accordance with aspects of the present disclosure.

FIG. 6 is a flow chart of an example method 200 in accordance with aspects of the present disclosure. At 202, a retention device is positioned along a chassis opening. The chassis opening is to receive an expansion card. The retention device includes a retaining arm and a retaining bracket pivotably coupled to the retaining arm along a first end of the retaining arm. The retaining arm includes a coupler and the chassis includes a receiver. At 204, the coupler is mated with the receiver to connect the retention device with the chassis. At 206, the retention arm is pivoted around a first axis defined at the mated coupler and receiver toward the chassis opening. At 208, the retaining bracket is slidably pivoted to engage a contact surface of the retaining bracket with a top surface of the interconnect bracket.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An expansion card retention device, comprising:
a retaining arm rotatably attachable to a chassis to form a first axis of rotation adjacent an end of the retaining arm and pivotable relative to the chassis between an open state and a closed state about the first axis, the retaining arm postionable along an expansion card and including an interior face to provide multi-point support along a top edge of the expansion card; and
a retaining bracket rotatably fastened to the retaining arm to form a second axis of rotation adjacent the end of the retaining arm and pivotable relative to the retaining arm about the second axis, the retaining bracket including a contact surface to engage with an interconnect bracket in the closed state,
wherein the retaining arm and retaining bracket are movable together between the open state and the closed state with a single user controlled operation;
wherein the retaining arm includes a coupler at the end of the retaining arm, and the coupler is mateable with a receiver of the chassis adjacent a chassis opening, wherein the first axis of rotation is formed by the coupler and the receiver.

2. The device of claim 1, wherein the retaining arm includes a releasable latch at an opposite end of the retaining arm, the releasable latch to releasably secure the opposite end of the retaining arm to the chassis.

3. The device of claim 1, wherein the retaining bracket is removable from the retaining arm.

4. The device of claim 1, comprising:
a biasing mechanism to bias the retaining bracket away from the interior face of the retaining arm in an unbiased state.

5. The device of claim 1, wherein the retaining bracket is rotatably fastened to the retaining arm with fasteners, wherein the second axis of rotation is formed by the fasteners.

6. A computing device, comprising:
a chassis including an interconnect bracket and a slot to maintain an expansion card, the expansion card slidably insertable into the slot and attachable to the interconnect bracket; and a retention device removably coupled along an opening of the chassis to maintain the expansion card within the chassis, the retention device including a retaining arm rotatably attachable to the chassis to form a first axis of rotation adjacent an end of the retaining arm and a retaining bracket rotatably fastened to the retaining arm to form a second axis of rotation adjacent the end of the retaining arm, the retaining arm pivotable relative to the chassis about the first axis and the retaining bracket pivotable relative to the retaining arm about the second axis to engage a contact surface of the retaining bracket with the interconnect bracket to retain the expansion card within the chassis,
wherein the contact surface is generally planar and extends across a width of the interconnect bracket adjacent to a top edge of the expansion card;
wherein the retaining arm includes a coupler at the end of the retaining arm and the chassis includes a receiver adjacent the opening of the chassis, wherein the first axis of rotation is formed by the coupler mated with the receiver.

7. The computing device of claim 6, wherein the retaining bracket includes a lower surface extending at an angle from the contact surface, the lower surface positionable adjacent to a surface of the chassis, the lower surface to couple to the surface.

8. The computing device of claim 6, wherein the retaining bracket is rotatably fastened to the retaining arm with a fastener, wherein the second axis of rotation is formed by the fastener.

9. The computing device of claim 6, wherein the retaining bracket is attachable to the chassis independent of the retaining arm to retain the expansion card within the chassis.

10. A method of maintaining an expansion card along an interconnect bracket within a chassis of a computing device, comprising:
positioning a retention device along a chassis opening, the chassis opening to receive an expansion card, the retention device including a retaining arm rotatably attachable to the chassis to form a first axis of rotation adjacent an end of the retaining arm and a retaining bracket rotatably fastened to the retaining arm to form a second axis of rotation adjacent the end of the retaining arm;
pivoting the retaining arm relative to the chassis toward the chassis opening about the first axis; and
with the pivoting of the retaining arm, pivoting the retaining bracket relative to the retaining arm about the second axis to engage a contact surface of the retaining bracket with a top surface of the interconnect bracket;
wherein positioning the retention device along the chassis opening includes mating a coupler of the retaining arm with a receiver of the chassis to form the first axis of rotation.

11. The method of claim 10, comprising:
pivoting the retaining arm until a support of the retaining arm is positioned against a top edge of the expansion card; and
coupling an opposite end of the retaining arm with an edge of the chassis to close the retaining device against the chassis.

12. The method of claim 10, comprising:
biasing the retaining bracket against an interior surface of the retaining arm.

13. The method of claim 10, wherein the retaining arm and retaining bracket of the retaining device are jointly operable together.

14. The method of claim 10, wherein the second axis of rotation is formed by a fastener rotatably fastening the retaining bracket to the retaining arm.

* * * * *